(12) United States Patent
Jeong et al.

(10) Patent No.: US 12,479,713 B2
(45) Date of Patent: Nov. 25, 2025

(54) WATER PURIFIER

(71) Applicant: SAMSUNG ELECTRONICS CO., LTD., Suwon-si (KR)

(72) Inventors: Yeonwoo Jeong, Suwon-si (KR); Jihoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 208 days.

(21) Appl. No.: 18/137,858

(22) Filed: Apr. 21, 2023

(65) Prior Publication Data
US 2023/0257254 A1 Aug. 17, 2023

Related U.S. Application Data

(63) Continuation of application No. PCT/KR2021/011836, filed on Sep. 2, 2021.

(30) Foreign Application Priority Data

Oct. 21, 2020 (KR) ........................ 10-2020-0136586

(51) Int. Cl.
*B67D 1/08* (2006.01)
(52) U.S. Cl.
CPC ................................. *B67D 1/0894* (2013.01)
(58) Field of Classification Search
None
See application file for complete search history.

(56) References Cited

U.S. PATENT DOCUMENTS

2006/0065126 A1* 3/2006 Turi .................... A47J 31/4482
99/279
2007/0000944 A1  1/2007 Cahen et al.
(Continued)

FOREIGN PATENT DOCUMENTS

JP          2006-341097         12/2006
KR            98-7414            4/1998
(Continued)

OTHER PUBLICATIONS

International Search Report dated Dec. 22, 2021 issued in PCT/KR2021/011836.
(Continued)

*Primary Examiner* — Paul R Durand
*Assistant Examiner* — Michael J. Melaragno
(74) *Attorney, Agent, or Firm* — STAAS & HALSEY LLP

(57) ABSTRACT

A water purifier includes: a main body having a water outlet at one side thereof; and a drip tray unit provided under the water outlet. The drip tray unit includes: a plurality of drip trays supporting a container, storing water drips, and configured to be folded or unfolded; a drip tray supporter to support the plurality of drip trays, the drip tray supporter slidably movable in a first direction with respect to the main body or in a second direction which is opposite to the first direction; and an actuator to adjust a folding or an unfolding of the plurality of drip trays while interlocking with the sliding movement of the drip tray supporter so that the plurality of drip tray folds in response to the drip tray supporter moving in the first direction or unfolds in response to the drip tray supporter moving in the second direction.

19 Claims, 15 Drawing Sheets

(56) References Cited

U.S. PATENT DOCUMENTS

| | | | | |
|---|---|---|---|---|
| 2007/0119516 | A1* | 5/2007 | Heger | B67D 1/16 141/86 |
| 2008/0314065 | A1* | 12/2008 | Kim | F25D 23/126 62/449 |
| 2010/0236414 | A1* | 9/2010 | Frigeri | A47J 31/4482 99/275 |
| 2013/0075424 | A1* | 3/2013 | Hwang | F25D 23/12 222/173 |
| 2018/0058749 | A1* | 3/2018 | Lee | B67D 1/0858 |
| 2019/0336894 | A1* | 11/2019 | Heil | B01D 33/333 |
| 2023/0257254 | A1* | 8/2023 | Jeong | B67D 1/0894 222/108 |

FOREIGN PATENT DOCUMENTS

| | | |
|---|---|---|
| KR | 10-2008-0111804 | 12/2008 |
| KR | 10-2010-0124564 | 11/2010 |
| KR | 10-2011-0122904 | 11/2011 |
| KR | 10-2012-0077664 | 7/2012 |
| KR | 10-2014-0036612 | 3/2014 |
| KR | 10-1379629 | 3/2014 |
| KR | 10-2015-0061298 | 6/2015 |
| KR | 10-1559497 | 10/2015 |
| KR | 10-2016-01144246 | 12/2016 |
| KR | 10-2017-004849 | 3/2017 |
| KR | 10-2018-0024297 | 3/2018 |
| WO | WO 2018/134047 A1 | 7/2018 |

OTHER PUBLICATIONS

Written Opinion Report dated Dec. 22, 2021 issued in PCT/KR2021/011836.

Office Action dated Aug. 9, 2025 issued in Korean Patent Application No. 10-2020-0136586.

* cited by examiner

WATER PURIFIER

CROSS-REFERENCE TO RELATED APPLICATIONS

This application is a continuation application, filed under 35 U.S.C. § 111(a), of International Application PCT/KR2021/011836 filed Sep. 2, 2021, and is based on and claims priority under 35 U.S.C. § 119 to Korean Patent Applications No. 10-2020-0136586, filed on Oct. 21, 2020, in the Korean Intellectual Property Office. The disclosures of which are incorporated by reference herein in their entirety.

BACKGROUND

Field

The disclosure relates to a water purifier, and more particularly to a tray unit that supports a container and stores water drips.

Description of the Related Art

Due to environmental pollution, a water purifier for producing drinking water by filtering water supplied from a reservoir has recently been widely spread. The water purifier includes a drip tray provided in the front of a main body thereof, allowing a cup of the like container to be put thereon, and catching water drips falling from a water outlet, and a cork operated by a control lever to discharge the purified water. A user may put the container on the drip tray and operate the control lever, thereby filling the container with water from the cock.

In a conventional water purifier, the drip tray is too small to put a large container such as a pot or a rice cooker thereon, and it is therefore inconvenient to repeatedly use a small container to fill the large container with water.

SUMMARY

According to an embodiment of the disclosure, there is provided a water purifier. The water purifier includes: a main body having a water outlet at one side thereof; and a drip tray unit under the water outlet. The drip tray unit includes: a plurality of drip trays supporting a container, storing water drips, and configured to be folded or unfolded; a drip tray supporter to support the plurality of drip trays, the drip tray supporter slidably movable in a first direction with respect to the main body or in a second direction which is opposite to the first direction; and an actuator to adjust a folding or an unfolding of the plurality of drip trays while interlocking with the sliding movement of the drip tray supporter so that the plurality of drip tray folds in response to the drip tray supporter moving in the first direction or unfolds in response to the drip tray supporter moving in the second direction.

The drip tray unit may further include a base having a guide to guide the drip tray supporter to move slidably.

The main body may include a base mounting portion to which the base is mounted.

The actuator may include: a first gear having a rod shape, supported on the base, and extended to the drip tray supporter; a second gear having a circle shape, engaging with the first gear, and configured to be rotated in the drip tray supporter; a third gear having a circle shape, and comprising an upper gear provided in an upper center of the second gear, and a lower gear provided in a lower center of the second gear; a fourth gear having a circle shape, engaging with the upper gear of the third gear, and configured to be rotated in the drip tray supporter; a fifth gear having a circle shape, engaging with the fourth gear, and provided in one of the drip trays; a sixth gear having a circle shape, engaging with the lower gear of the third gear, and configured to be rotated in the drip tray supporter; a seventh gear having a circle shape, engaging with the sixth gear, and configured to be rotated in the drip tray supporter; and an eighth gear having a circle shape, engaging with the seventh gear, and provided in an other one of the drip trays.

The actuator may include a first actuator, and the drip tray unit may further include a second actuator to actuate the drip tray supporter to move sliding.

The second actuator may include: a ninth gear having a rod shape, having a first side supported on the drip tray supporter and a second side extended into the base; a tenth gear having a circle shape, engaging with the ninth gear, and provided in the base; and a motor to rotate the tenth gear.

The main body may include a button to operate the motor.

The drip tray unit may include a supporter provided between the drip trays and having a same height as a height of the drip trays.

The supporter may include a front supporter provided between the drip trays and having the same height as the height of the drip trays.

The supporter may include a transverse supporter extended in a transverse direction to the front supporter and having the same height as the height of the drip trays.

The supporter may include a rear supporter extended in a rearward direction of the drip trays and having the same height as the height of the drip trays.

The rear supporter may include a pair of rear supporters extended from the transverse supporter rearwards with a space therebetween, and accommodated to be slidably movable within the guides of the base.

The drip tray unit may include a first auxiliary drip tray provided in a space between the pair of rear supporters and the transverse supporter and storing water drips.

The front supporter may include a second auxiliary drip tray to catch water drips falling from the water outlet.

The drip tray may include a drip tray groove to accommodate the second auxiliary drip tray therein.

The second auxiliary drip tray may include a communication hole communicating with the drip tray.

BRIEF DESCRIPTION OF DRAWINGS

Other aspects, features and advantages of the disclosure will become more apparent from the following detailed description, taken in conjunction with the accompanying drawings.

DETAILED DESCRIPTION

Figure 1:
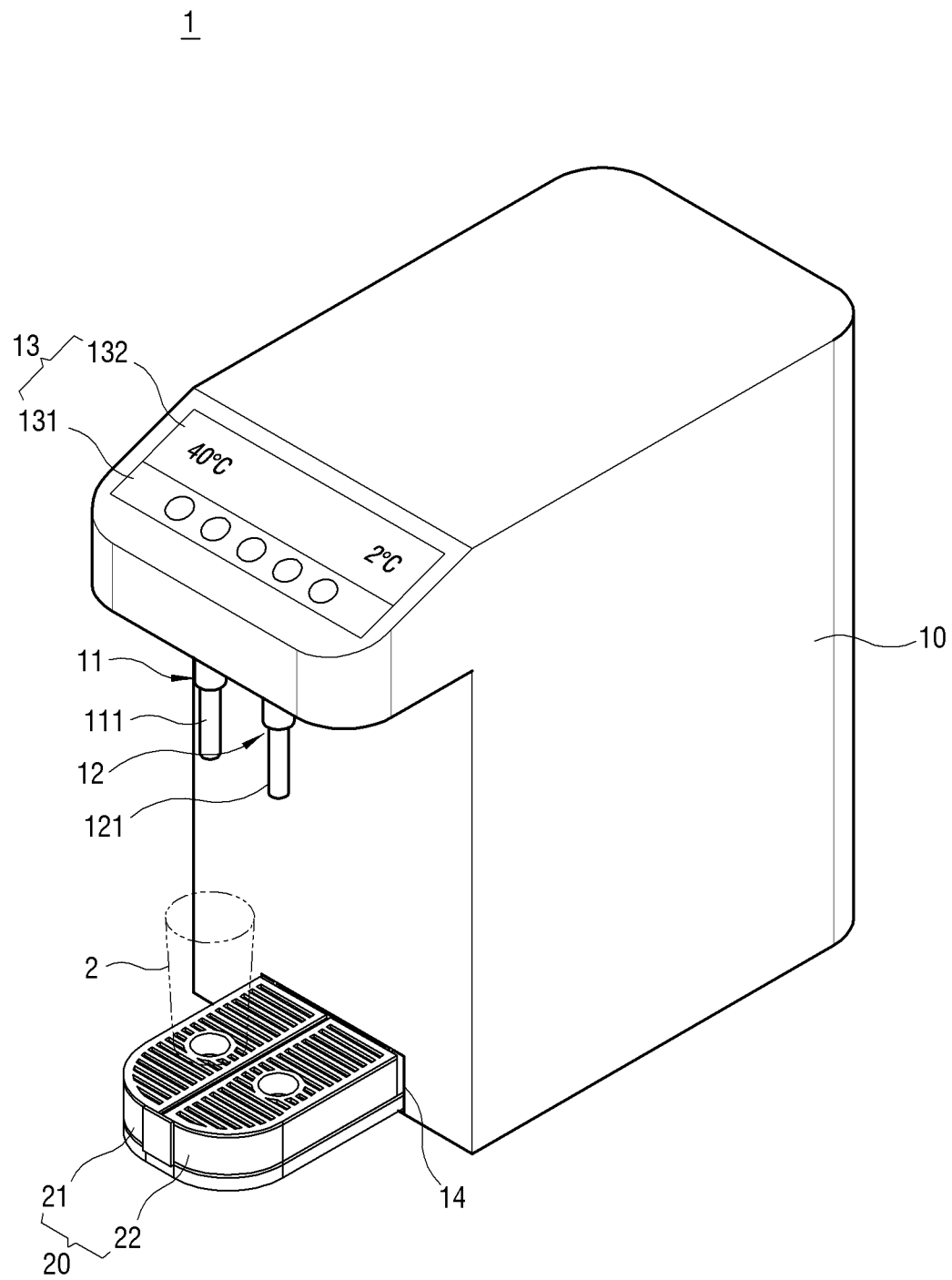
FIG. 1 illustrates a water purifier according to an embodiment.

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical concept of the disclosure and its key configurations and functions are not limited to those described in the following embodiments. In the following descriptions, details about publicly known technologies or configurations may be omitted if they unnecessarily obscure the gist of the disclosure.

In the disclosure, terms "have," "may have," "include," "may include," etc. indicate the presence of corresponding features (e.g., a numeral value, a function, an operation, or an element such as a part, etc.), and do not exclude the presence of additional features.

In the disclosure, terms "A or B", "at least one of A or/and B", "one or more of A or/and B" or the like may include all possible combinations of elements enumerated together. For example, "A or B", "at least one of A and B", or "at least one of A or B" may refer to all of the cases of (1) including at least one A, (2) including at least one B, or (3) including all of at least one A and at least one B.

In the disclosure, terms "first", "second", etc. are used only to distinguish one element from another, and singular forms are intended to include plural forms unless otherwise mentioned contextually.

In addition, in the disclosure, terms "upper", "lower", "left", "right", "inside", "outside", "inner", "outer", "front", "rear", etc. are defined with respect to the accompanying drawings, and do not: restrict the shape or location of the elements.

Further, in the disclosure, the expression of "configured to (or set to)" may for example be replaced with "suitable for," "having the capacity to," "designed to," "adapted to," "made to," or "capable of" according to circumstances.

The disclosure is to provide a water purifier, of which a tray area for a container is enlarged to stably support the container.

According to the disclosure, a water purifier includes a pair of drip trays ejected forwards from a main body and unfolded left and right, so that an available tray area can be largely extended, thereby supporting a large container such as a pot or a rice cooker thereon.

Further, the water purifier is convenient for a user to extend or reduce the tray area because the pair of drip trays are unfolded left and right at the same time when a tray unit moves sliding forwards.

Figure 2:
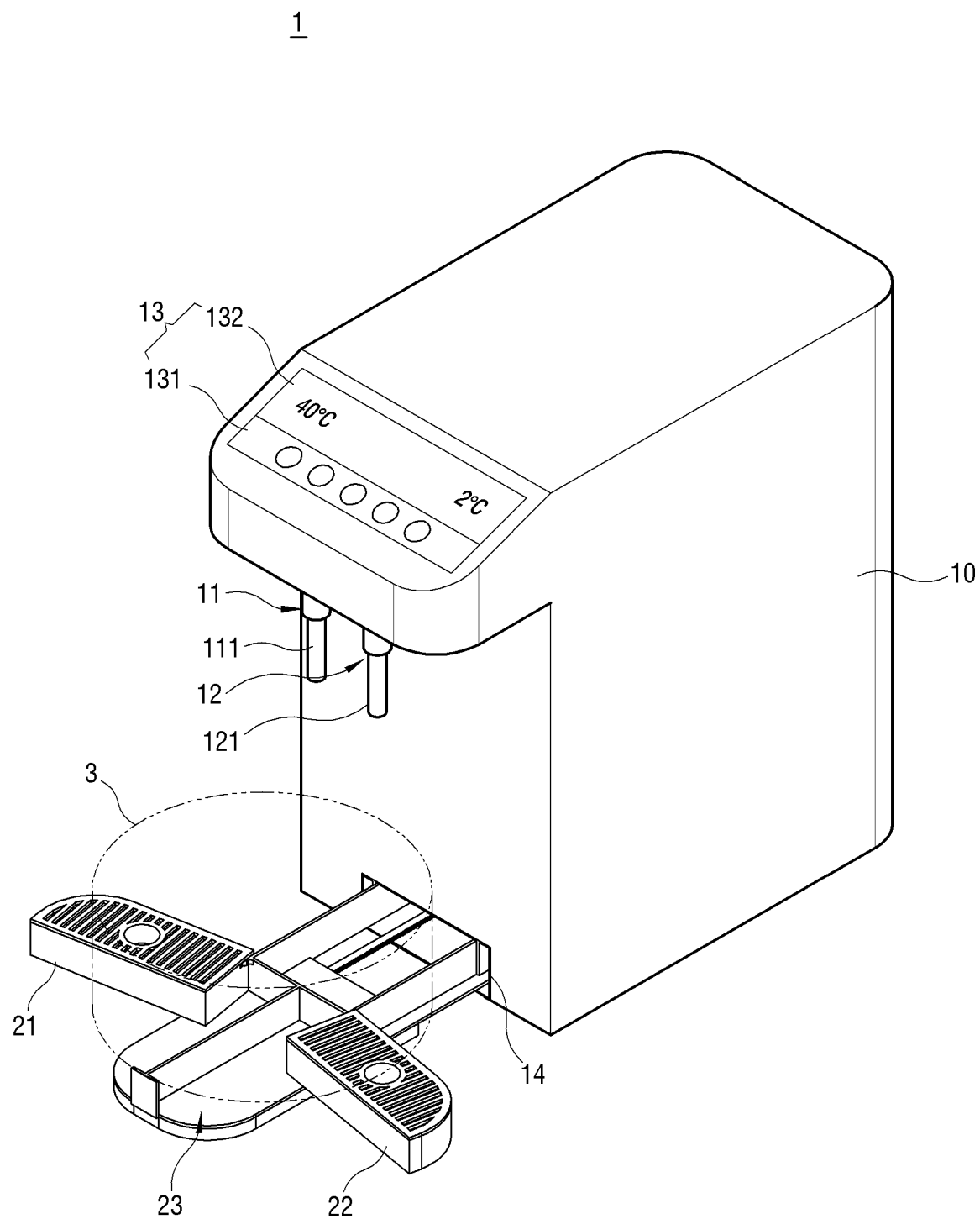
FIG. 2 illustrates an extended state of a drip tray unit in FIG. 1.

FIG. 1 illustrates a water purifier 1 according to an embodiment, and FIG. 2 illustrates an extended state of a drip tray unit 20 in FIG. 1.

Referring to FIGS. 1 and 2, the water purifier 1 includes a main body 10, and a drip tray unit 20 retractably coupled to the main body 10 and catching and storing water drips.

The main body 10 may be internally provided with one or more filters to purify water.

The main body 10 includes first and second cocks 11 and 12 provided in the front thereof and respectively including first and second water outlets 111 and 121 for discharging the purified water, a control panel 13, and a base mounting portion 14.

The first and second cocks 11 and 12 may be used in discharging hot water and cold water, respectively. Of course, the main body 10 may include only a single cock used in selectively discharging hot water and cold water.

The first and second cocks 11 and 12 may further include control lever to open and close the water outlets 111 and 121. In this case, water may flow out when the control lever is pressed, and stop when the control level is returned.

The control panel 13 may include a control portion 131 for selecting functions, and a display portion 132 for displaying the temperatures of hot water and cold water.

The control portion 131 may include a plurality of buttons. The plurality of buttons may include a hot water button for selecting a hot-water discharging function, a purified water button for selecting a purified-water discharging function, a cold water button for selecting a cold-water discharging function, and an extension or reduction control button for the drip tray unit 20.

The display portion 132 may display the states of the water purifier, for example, operation indication, a hot water temperature, a cold water temperature, the presence of ice, error indication, etc.

The base mounting portion 14 is formed under the front of the main body 10 where the first and second cocks 11 and 12 are provided. A base 24 (to be described later) (see FIG. 3) may be accommodated in and mounted to the base mounting portion 14.

The drip tray unit 20 may be extended or reduced according to the size of a container to be filled with water.

When a small container 2, for example, a cup is filled with water as shown in FIG. 1, the drip tray unit 20 may be used as a space between first and second drip trays 21 and 22 is reduced, in other words, in a folded state.

Figure 3:
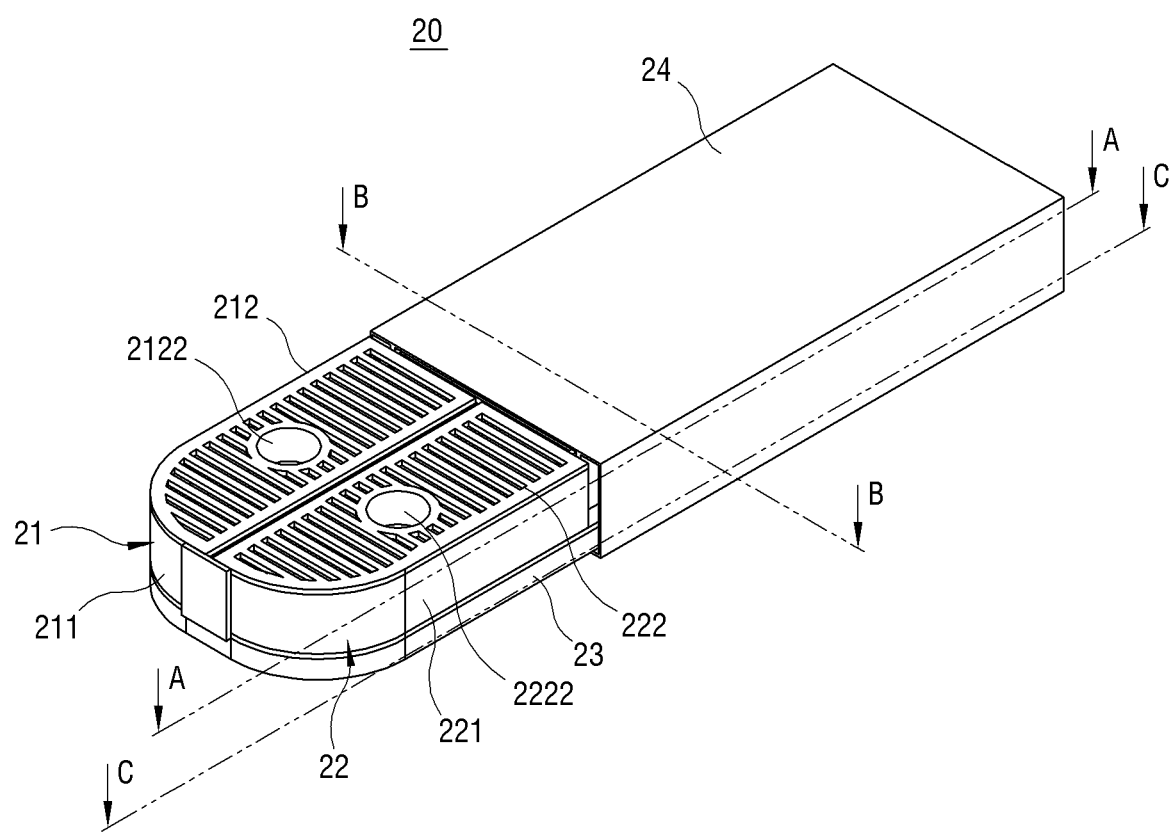
FIG. 3 illustrates a separated state of the drip tray unit of FIG. 1.
Figure 4:
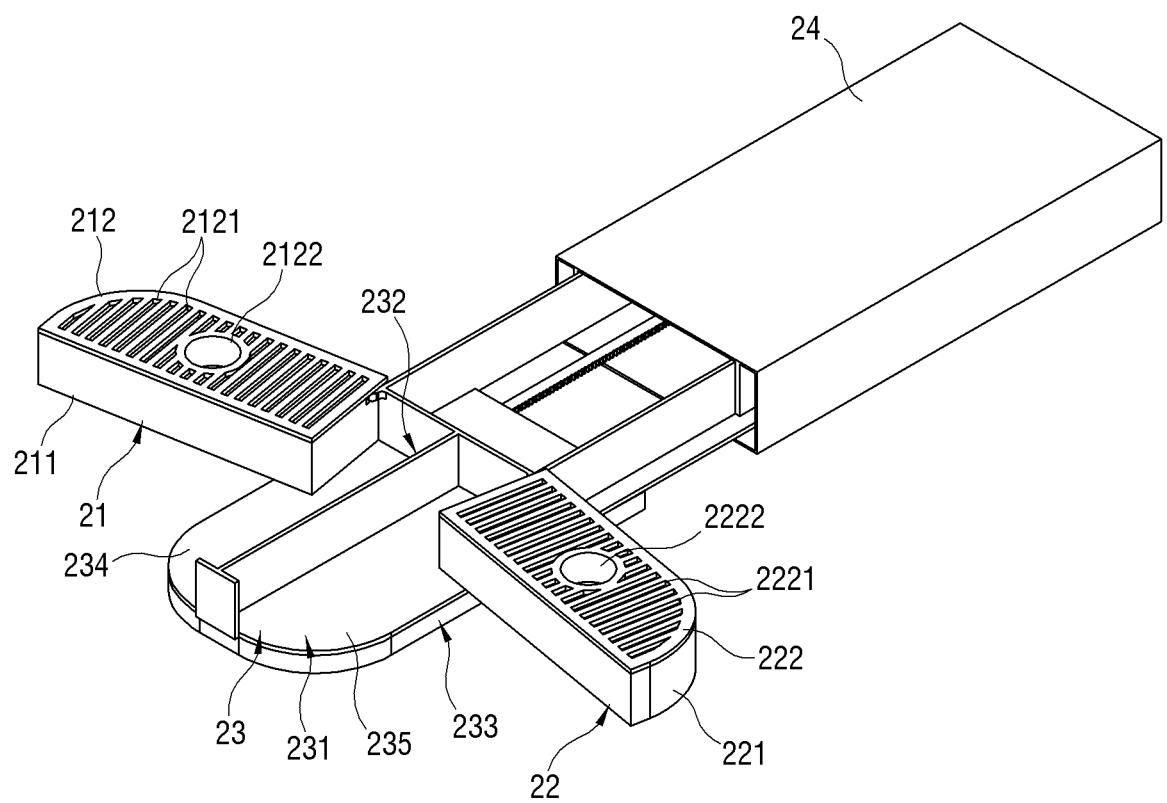
FIG. 4 illustrates a separated state of the drip tray unit of FIG. 2.
Figure 5:
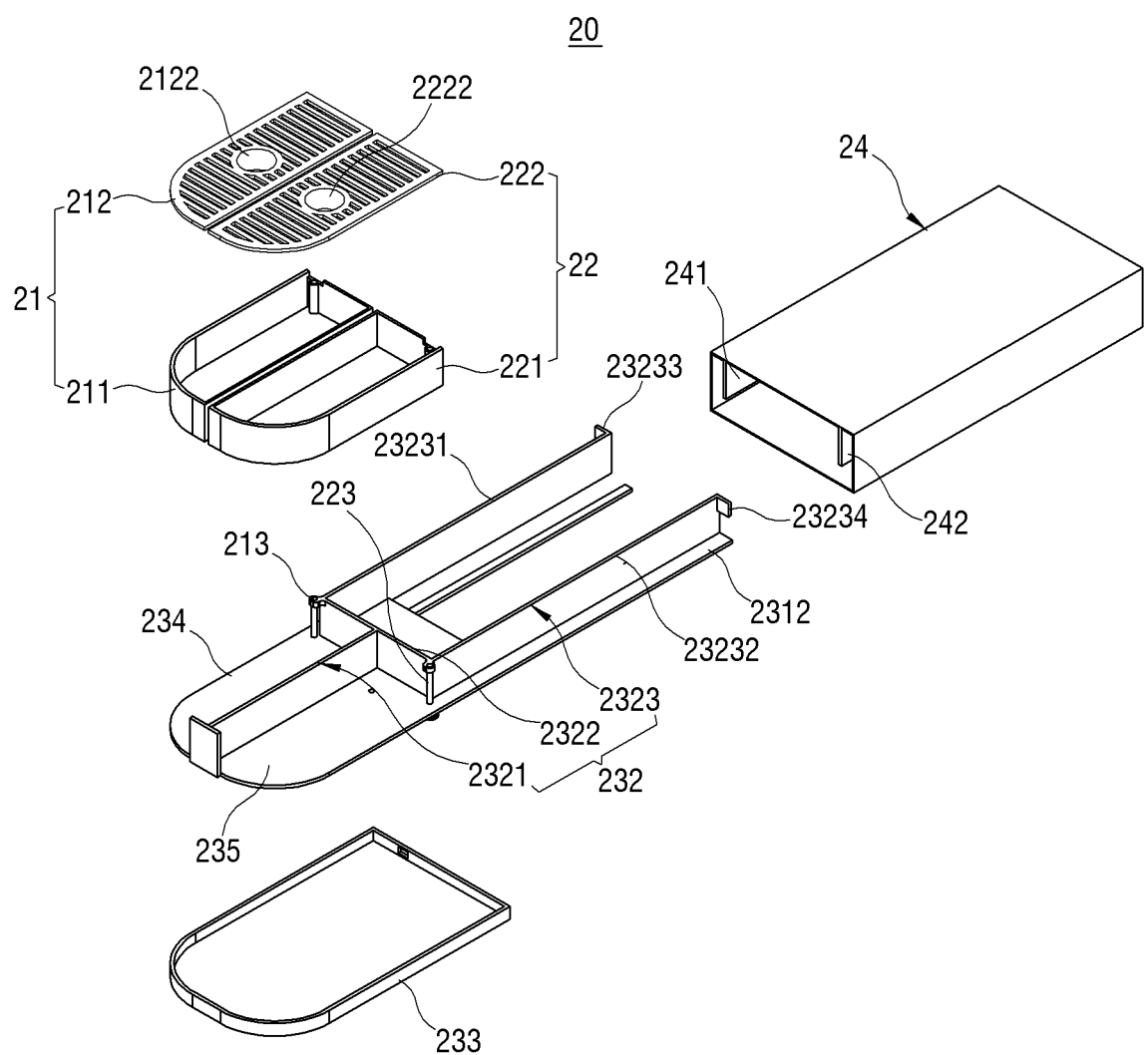
FIG. 5 is an exploded perspective view of the drip tray unit of FIG. 3 viewed from above.
Figure 6:
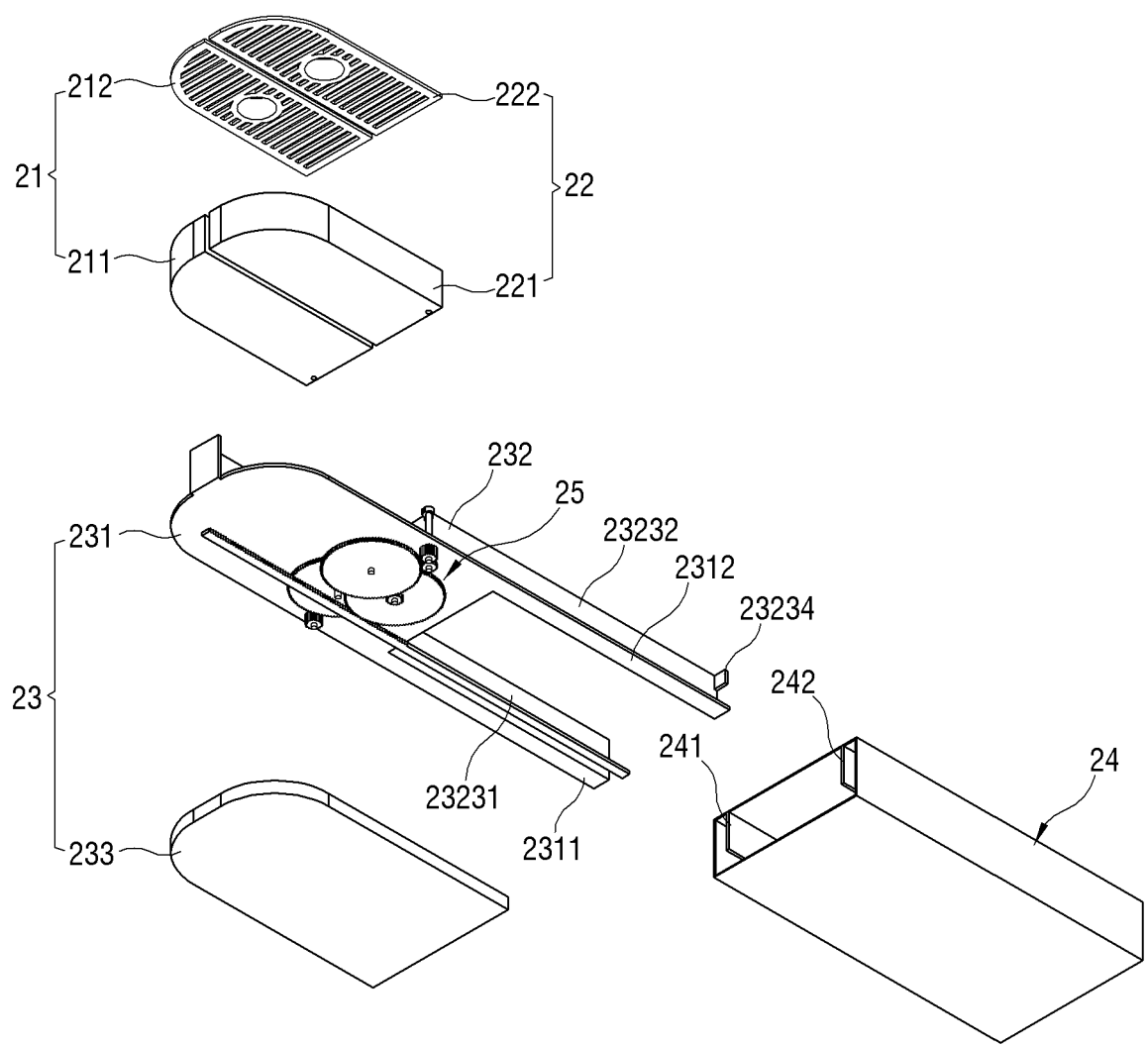
FIG. 6 is an exploded perspective view of the drip tray unit of FIG. 3 viewed from below.
Figure 7:
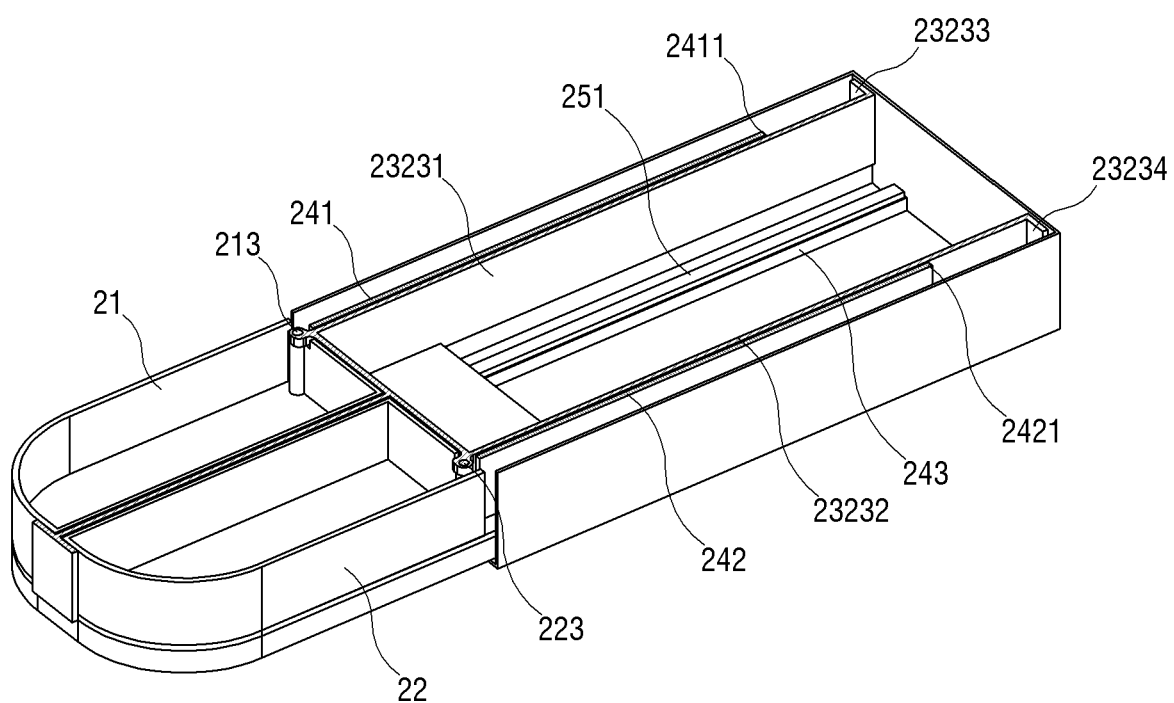
FIG. 7 is a cut-open perspective view taken along line A-A of FIG. 3.
Figure 8:
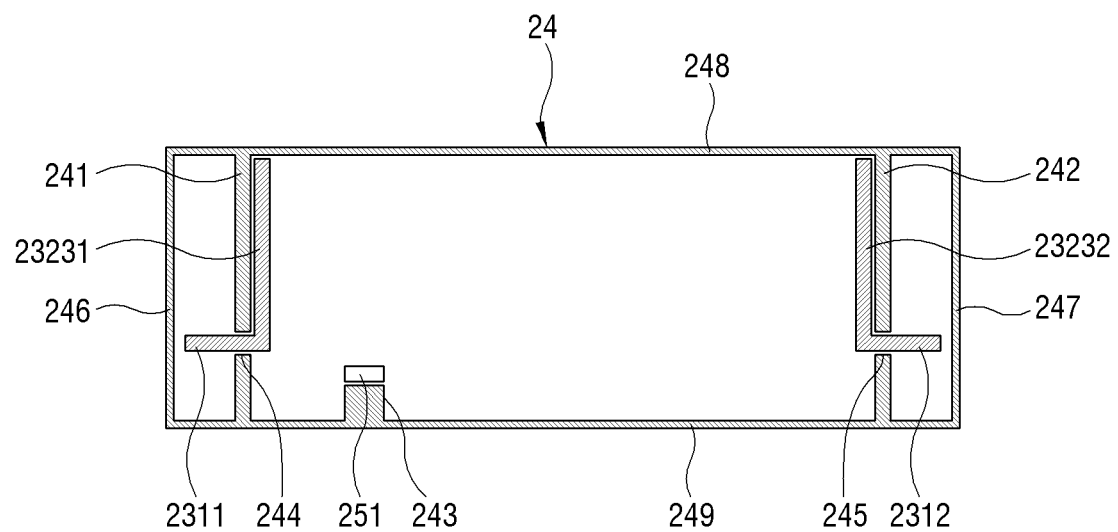
FIG. 8 is a cross-sectional view taken along line B-B of FIG. 3.
Figure 9:
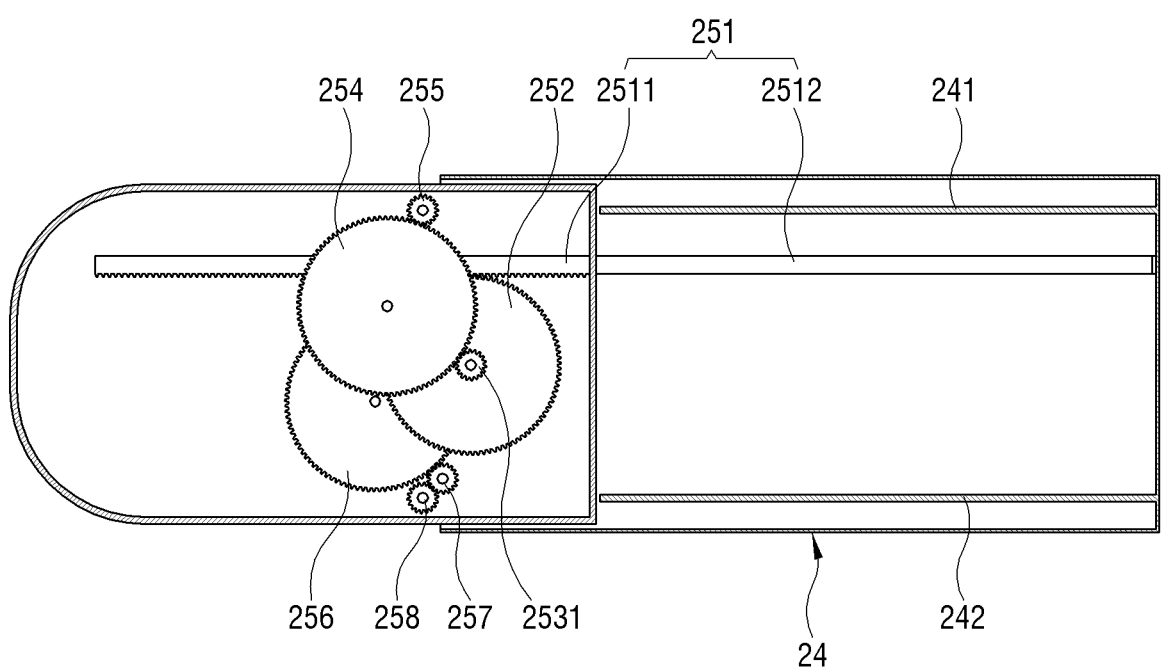
FIG. 9 is a cross-sectional view taken along line C-C of FIG. 3.
Figure 10:
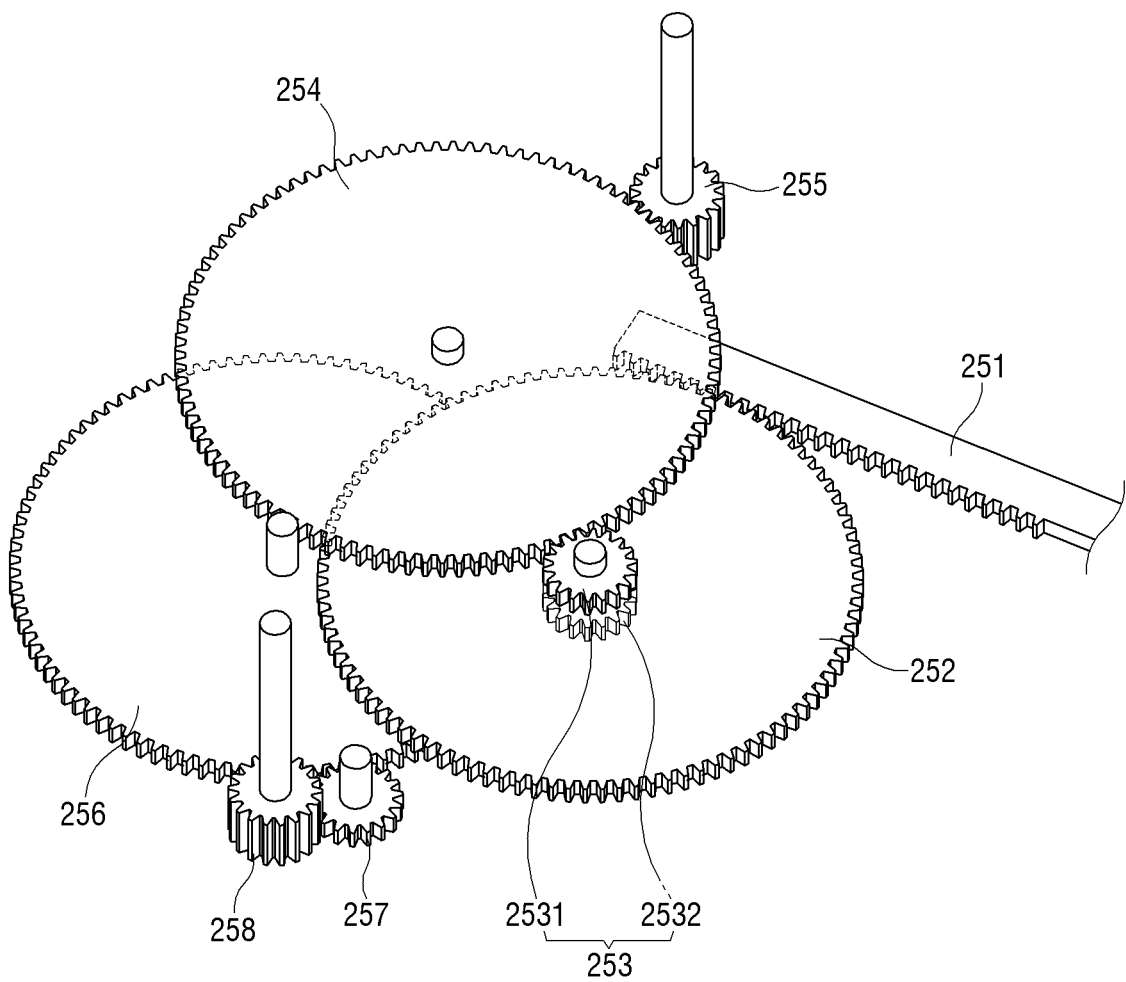
FIG. 10 illustrates an actuator according to an embodiment.

When a large container 3, for example, a pot is filled with water as shown in FIG. 2, the drip tray unit 20 may be used as the space between first and second drip trays 21 and 22 is extended, in other words, in an unfolded state FIG. 3 illustrates a separated state of the drip tray unit 20 of FIG. 1, FIG. 4 illustrates a separated state of the drip tray unit 20 of FIG. 2, FIG. 5 is an exploded perspective view of the drip tray unit 20 of FIG. 3 viewed from above, FIG. 6 is an exploded perspective view of the drip tray unit 20 of FIG. 3 viewed from below, FIG. 7 is a cut-open perspective view taken along line A-A of FIG. 3, FIG. 8 is a cross-sectional view taken along line B-B of FIG. 3, FIG. 9 is a cross-sectional view taken along line C-C of FIG. 3, and FIG. 10 illustrates an actuator 25 according to an embodiment.

Referring to FIGS. 3 to 6, the drip tray unit 20 includes the first and second drip trays 21 and 22, a drip tray supporter 23, a base 24, and the actuator 25. The number of drip trays is not limited to two, and three or more drip trays may be provided.

The first and second drip trays 21 and 22 may catch and store water falling from the first and second water outlets 111 and 121 (see FIG. 2), respectively, and support containers to be filled with water.

The first and second drip trays 21 and 22 may has the folded state and the unfolded state which are different in the space therebetween.

The first and second drip trays 21 and 22 may include first and second casings 211 and 221 shaped like a box opened upwards to store water. The first and second drip trays 21 and 22 may include first and second grill members 212 and 222 put on the first and second casings 211 and 221, respectively.

The first and second casings 211 and 221 may be disposed to face each other on one surface while having the same shape. The first and second casings 211 and 221 may be supported on the drip tray supporter 23 at certain sides thereof so as to rotate around hinge shafts 213 and 223, respectively.

As an alternative embodiment, the first and second casings 211 and 221 may not rotate but straightly move leaving the same distance from each other according to the operations of the actuator 25.

The first and second grill members 212 and 222 may be formed with a plurality of slots 2121 and 2221. The first and second grill members 212 and 222 may be formed with circular water through holes 2122 and 2222 larger than the slots 2121 and 2221 and positioned under the corresponding first and second water outlets 111 and 121 (see FIG. 1), respectively. Therefore, water may fall from the first and second water outlets 111 and 121 directly to the first and second casings 211 and 221 via the water through holes 2122 and 2222 without colliding with the first and second grill members 212 and 222.

The drip tray supporter 23 may support the first and second drip trays 21 and 22, and move sliding in a first direction or a second direction opposite to the first direction with respect to the main body 10.

The drip tray supporter 23 includes a base plate 231, a supporter 232 provided on the top of the base plate 231, a gear cover 233 coupled to the bottom of the base plate 231 with a predetermined space therebetween, and first and second drip tray mounting portions 234 and 235.

The base plate 231 may be substantially shaped like a square plate. The base plate 231 may include first and second tail portions 2311 and 2312 protruding and extending rearwards in parallel with a predetermined space therebetween. The first and second tail portions 2311 and 2312 may include first and second rear supporters 23231 and 23232 (to be described later).

The supporter 232 may include a front supporter 2321, a transverse supporter 2322, and a rear supporter 2323.

The front supporter 2321 is provided at the center on the top of the base plate 231 and extended forwards and backwards. The front supporter 2321 may be shaped like a plate of which one side is erected at the center on the top of the base plate 231 in forward and backward directions. The front supporter 2321 may support a front bottom portion of a container to be filled with water when the first and second drip trays 21 and 22 are unfolded to be spaced apart from each other.

The transverse supporter 2322 is extended on the top of the base plate 231 transversely to the front supporter 2321. The middle portion of the transverse supporter 2322 couples integrally with the rear end of the front supporter 2321. The transverse supporter 2322 may be shaped like a plate of which one side is erected on the top of the base plate 231 in a transverse direction. The transverse supporter 2322 may support left and right bottom portions of a container to be filled with water when the first and second drip trays 21 and 22 are unfolded.

The front supporter 2321 and the transverse supporter 2322 may be provided in the form of 'T'.

The rear supporter 2323 may include the first and second rear supporters 23231 and 23232 extended rearwards from the opposite ends of the transverse supporter 2322 leaving a space therebetween. The first and second rear supporters 23231 and 23232 may be each shaped like a plate of which one side one side is erected on the top of the base plate 231 in a reward direction.

The first and second rear supporters 23231 and 23232 may include first and second stoppers 23233 and 23234 at the rear ends thereof as shown in FIG. 7, respectively. The first and second stoppers 23233 and 23234 are stopped by first and second protrusions 2411 and 2421 of first and second guides 241 and 242 (to be described later) when the first and second rear supporters 23231 and 23232 move along the first and second guides 241 and 242, thereby preventing the drip tray supporter 23 from being completely separated from the base 24.

The top portion of the rear supporter 2323 ejected from the main body 10 may support a bottom rear portion of a container to be filled with water when the first and second drip trays 21 and 22 are unfolded.

The first and second rear supporters 23231 and 23232 may, together with the first and second tail portions 2311 and 2312, serve as rails that moves sliding in the first and second guides 241 and 242 of the base 24 (to be described later).

All the front supporter 2321, the transverse supporter 2322, and the rear supporter 2323 may be formed to have the same height to stably support the bottom of the container to be filled with water when the first and second drip trays 21 and 22 are unfolded.

The gear cover 233 may cover the actuator 25 provided beneath the base plate 231.

The first and second drip tray mounting portions 234 and 235 may be formed by the front supporter 2321 and the transverse supporter 2322. In the first and second drip tray mounting portions 234 and 235, the first and second drip trays 21 and 22 may be rotatably seated.

Referring to FIGS. 6 to 9, the base 24 is shaped like a quadrangular box. The base 24 may, as shown in FIG. 2, be inserted in the base mounting portion 14 (see FIG. 2) provided in the lower end portion of the main body 10.

The base 24 includes the first and second guides 241 and 242 extended frontwards and backwards leaving predetermined spaces from opposite lateral walls 246 and 247, and a gear supporter 243 provided on the bottom and supporting a first gear 251 shaped like a rod (to be described later).

The first and second guides 241 and 242 are provided as plates of which first sides coupling integrally with a ceiling 248 and second sides coupling integrally with a bottom 249. Therefore, the first and second guides 241 and 242 may be formed with first and second gaps 244 and 245 extended from the front to the back. Thus, the first and second tail portions 2311 and 2312 of the base plate 231 move sliding as being inserted in the gaps 244 and 245.

The first and second guides 241 and 242 are provided with first and second protrusions 2411 and 2421 in rear upper end portions thereof. The first and second protrusions 2411 and 2421 hold the first and second stoppers 23233 and 23234 of the first and second rear supporters 23231 and 23232 that move sliding, thereby restricting further movement of the first and second rear supporters 23231 and 23232.

The gear supporter 243 protrudes being extended forwards and backwards to hold and support the rod-shaped first gear 251. Of course, the gear supporter 243 may hold and support the rod-shaped first gear 251 by a screw, a wedge or adhesive, or a combination thereof.

Referring to FIGS. 6, 9 and 10, the actuator 25 may have a rack and pinion gear structure and be mounted to the bottom of the base plate 231.

The actuator 25 may switch the first and second drip trays 21 and 22 over between the folded state and the unfolded state while interlocking with the sliding movement of the drip tray supporter 23, thereby adjusting the space between the first and second drip trays 21 and 22.

The actuator 25 may include first to eighth gears 251 to 258.

The first gear 251 is shaped like a rod, and includes a first side formed with a gear portion 2511 and a second side formed with a fixed portion 2512. The fixed portion 2512 is fixed to and supported on the gear supporter 243 of the base 24, and the gear unit 2511 is extended to the bottom of the base plate 231 beyond the gear cover 233.

A second gear 252 is shaped like a disc, and rotatably supported on the bottom of the base plate 231 while engaging with the gear unit 2511 of the first gear 251.

Referring to FIG. 10, a third gear 253 is shaped like a cylinder having a smaller diameter than the second gear 252, and supported at the center of the second gear 252, thereby rotating together with the second gear 252.

The third gear 253 includes an upper gear 2531 provided at an upper center of the second gear 252, and a lower gear 2532 provided at a lower center of the second gear 252.

The upper gear 2531 may engage with a fourth gear 254.

The lower gear 2532 may engage with a sixth gear 256.

The fourth gear 254 is shaped like a disc, and rotatably supported on the bottom of the base plate 231 while engaging with the upper gear 2531 of the third gear 253.

A fifth gear 255 is shaped like a cylinder having a smaller diameter than the fourth gear 254, and supported on the first drip tray 21 while engaging with the fourth gear 254.

A sixth gear 256 is shaped like a disc, and rotatably supported on the bottom of the base plate 231 while engaging with the lower gear 2532 of the third gear 253.

A seventh gear 257 is shaped like a disc similarly to the sixth gear 256, and rotatably supported on the bottom of the base plate 231 while engaging with the sixth gear 256. The seventh gear 257 has a rotating direction switching function in consideration of the second drip tray 22 rotating in an opposite direction to the first drip tray 21.

An eighth gear 258 is shaped like a cylinder, and supported on the second drip tray 22 while engaging with the seventh gear 257.

Below, the operations of the actuator 25 will be described.

The drip tray supporter 23 moves sliding from the main body 10 in the first direction manually by a user or automatically by the rotation of a motor 273 (see FIG. 13) of a second actuator 27. In this case, the circular second gear 252 provided in the drip tray supporter 23 may be rotated by the rod-shaped first gear 251 fixed to the base 24.

The rotation of the second gear 252 may rotate a chain of the third gear 253, the fourth gear 254, and the fifth gear 255, so that the first drip tray 21 fixed to the fifth gear 255 can rotate in one direction.

Meanwhile, the rotation of the second gear 252 may rotate a chain of the third gear 253, the sixth gear 256, the seventh gear 257, and the eighth gear 258, so that the first drip tray 21 fixed to the eighth gear 258 can rotate in the other direction.

In this way, the first and second drip trays 21 and 22 may be switched from the folded state over to the unfolded state as the second to eighth gears 252 to 258 are rotated while interlocking with the sliding movement of the drip tray supporter 23 in the first direction, so that the space between the first and second drip trays 21 and 22 can be widened, thereby extending a tray area.

On the other hand, the drip tray supporter 23 may move sliding in the second direction opposite to the first direction manually by a user or automatically by the rotation of the motor 273 (see FIG. 13) of the second actuator 27.

In this way, the first and second drip trays 21 and 22 may be switched from the unfolded state over to the folded state as the second to eighth gears 252 to 258 are rotated in the opposite direction while interlocking with the sliding movement of the drip tray supporter 23 in the second direction, so that the space between the first and second drip trays 21 and 22 can be narrowed, thereby reducing a tray area.

As described above, the actuator 25 may extend or reduce the first and second drip trays 21 and 22 to the unfolded state or the folded state while interlocking with the operation of ejecting and retracting the drip tray supporter 23 from or into the main body 10. Thus, the first and second drip trays 21 and 22 may, together with the supporter 232, stably support the large container 3 in the unfolded state, and support the small container 2 in the folded state.

The actuator 25 is not limited to the rack and pinion gear structure, but may have any structure as long as the space between the first and second drip trays 21 and 22 is adjustable as the drip tray supporter 23 moves sliding with respect to the main body 10. For example, the actuator 25 may employ a belt, a chain, a spring, etc. instead of the gears, or a combination thereof.

Figure 11:
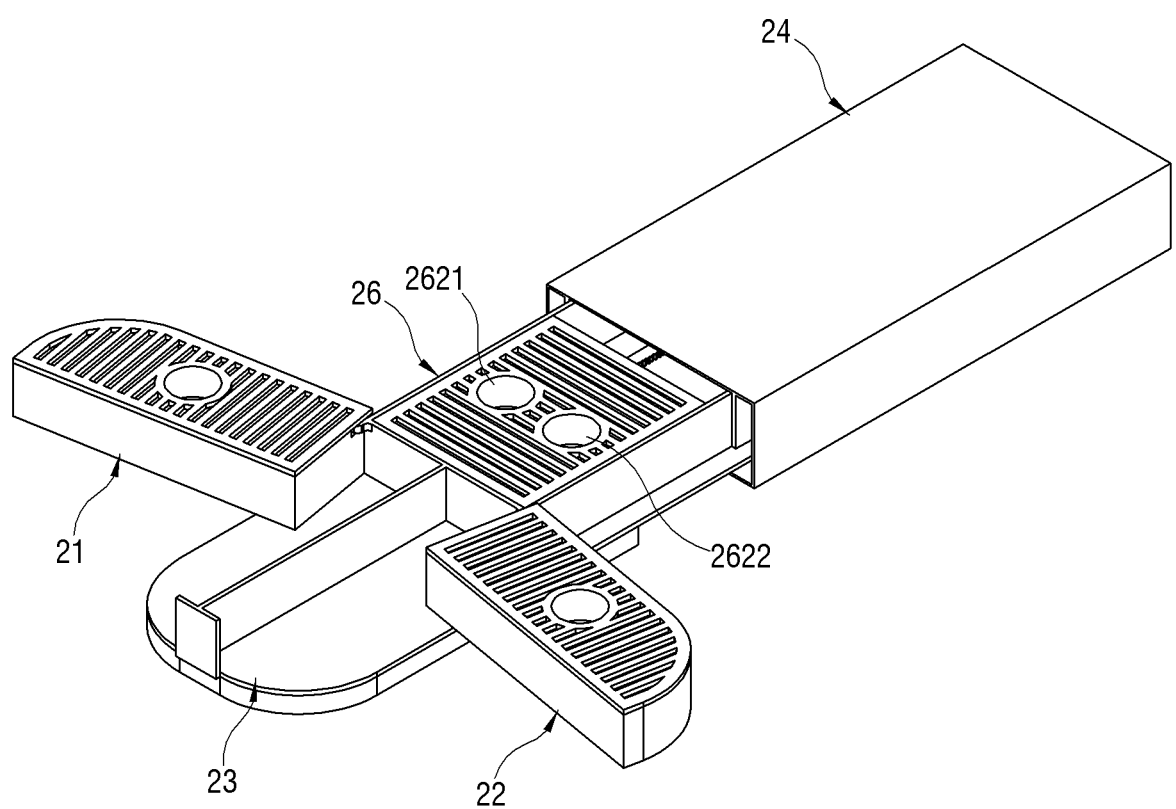
FIG. 11 illustrates a drip tray unit according to another embodiment.
Figure 12:
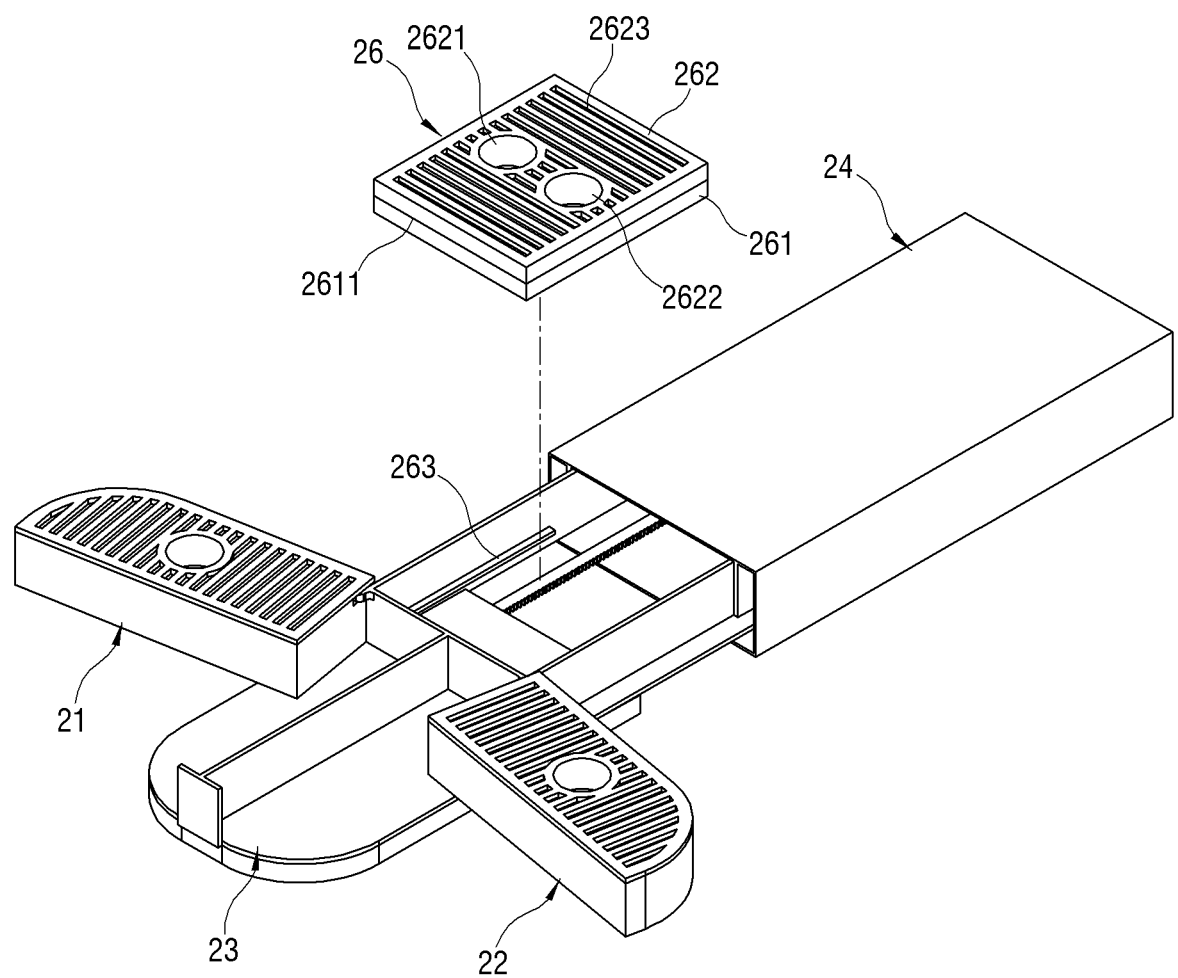
FIG. 12 illustrates the drip tray unit of FIG. 11, from which the auxiliary drip tray is separated.

FIG. 11 illustrates a drip tray unit 20 according to another embodiment, and FIG. 12 illustrates an auxiliary drip tray 26 of FIG. 11.

In the state that the drip tray supporter 23 is ejected from the main body 10, water from the first and second cocks 11 and 12 may fall not to the first and second drip trays 21 and 22 but between the ejected first and second rear supporters 23231 and 23232, and leak out.

Referring to FIGS. 11 and 12, the drip tray unit 20 may include the auxiliary drip tray 26 provided in a space between the transverse supporter 2322 and the first and second rear supporters 23231 and 23232.

The auxiliary drip tray 26 may include a third casing 261 and a third grill member 262.

The third grill member 262 may be formed with a plurality of slots 2623, and two water through holes 2621 and 2622. The two water through holes 2621 and 2622 are positioned under the first and second cocks 11 and 12, so that water may fall directly to the third casing 261.

The third casing 261 may be shaped like a quadrangular box and filled with water. The third casing 261 may include a flange 2611 on an upper end thereof.

Meanwhile, the first and second rear supporters 23231 and 23232 may be provided with protrusions 263 on the lateral surfaces thereof facing each other.

Therefore, the auxiliary drip tray 26 may be detachably mounted by the flange 2611 of the third casing 261, and the protrusions 263 of the first and second rear supporters 23231 and 23232.

Figure 13:
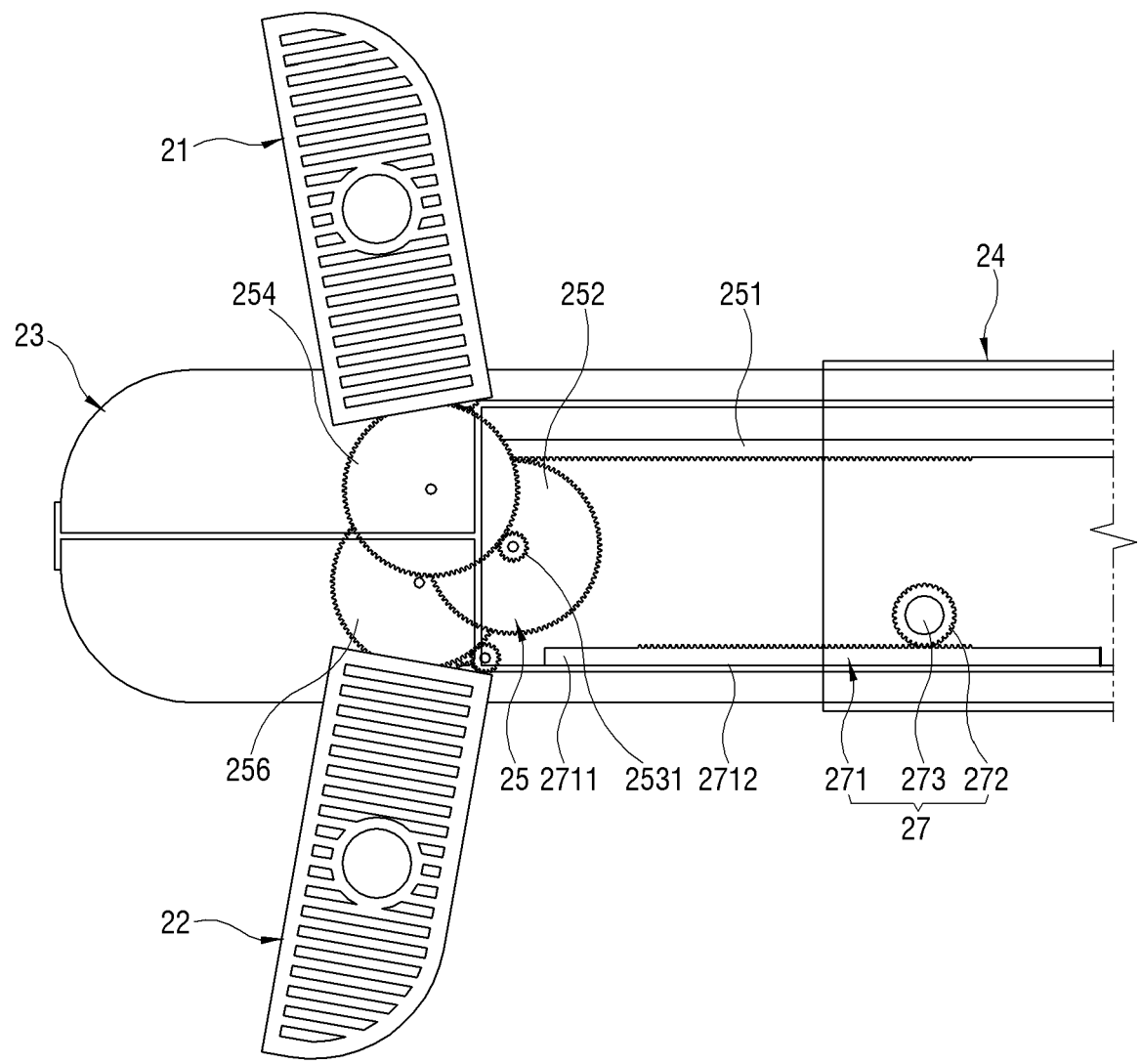
FIG. 13 illustrates a drip tray unit according to still another embodiment.

FIG. 13 illustrates a drip tray unit 20 according to still another embodiment.

Referring to FIG. 13, the drip tray unit 20 may further include the second actuator 27.

The second actuator 27 may include a ninth gear 271, a tenth gear 272, and the motor 273.

The ninth gear 271 may be shaped like a rod, and include a fixed portion 2711 and a gear portion 2712. The fixed portion 2711 is fixed to and supported on the base plate 231 of the drip tray supporter 23. The gear portion 2712 includes gear teeth in an extending direction, and is extended toward the base 24.

The tenth gear 272 is shaped like a cylinder, and has a center fixedly supported on a rotary shaft of the motor 273 while engaging with the ninth gear 271.

The rotary shaft of the motor 273 is supported on the center of the tenth gear 272. The motor 273 may operate based on control of an extension or reduction control button of the control panel 13 (see FIG. 1).

As described above, the second actuator 27 may rotate the tenth gear 272 based on the rotation of the motor 273 so that the rod-shaped ninth gear 271 can straightly reciprocate, thereby allowing the drip tray supporter 23 holding and supporting the rod-shaped ninth gear 271 to move sliding. In this way, a user can extend or reduce the tray area of the drip tray unit 20 by only button control.

Figure 14:
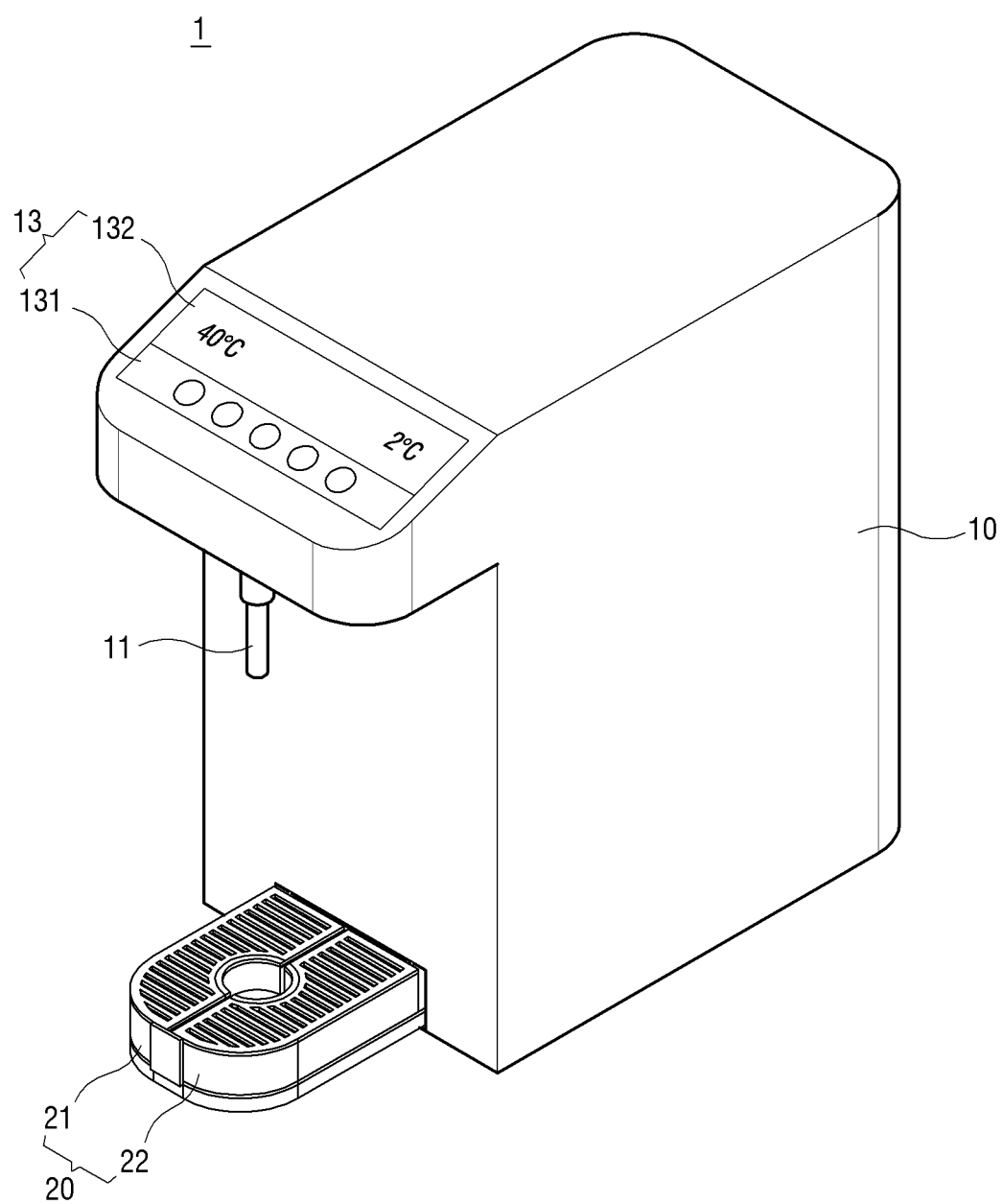
FIG. 14 illustrates a drip tray unit according to yet another embodiment.
Figure 15:
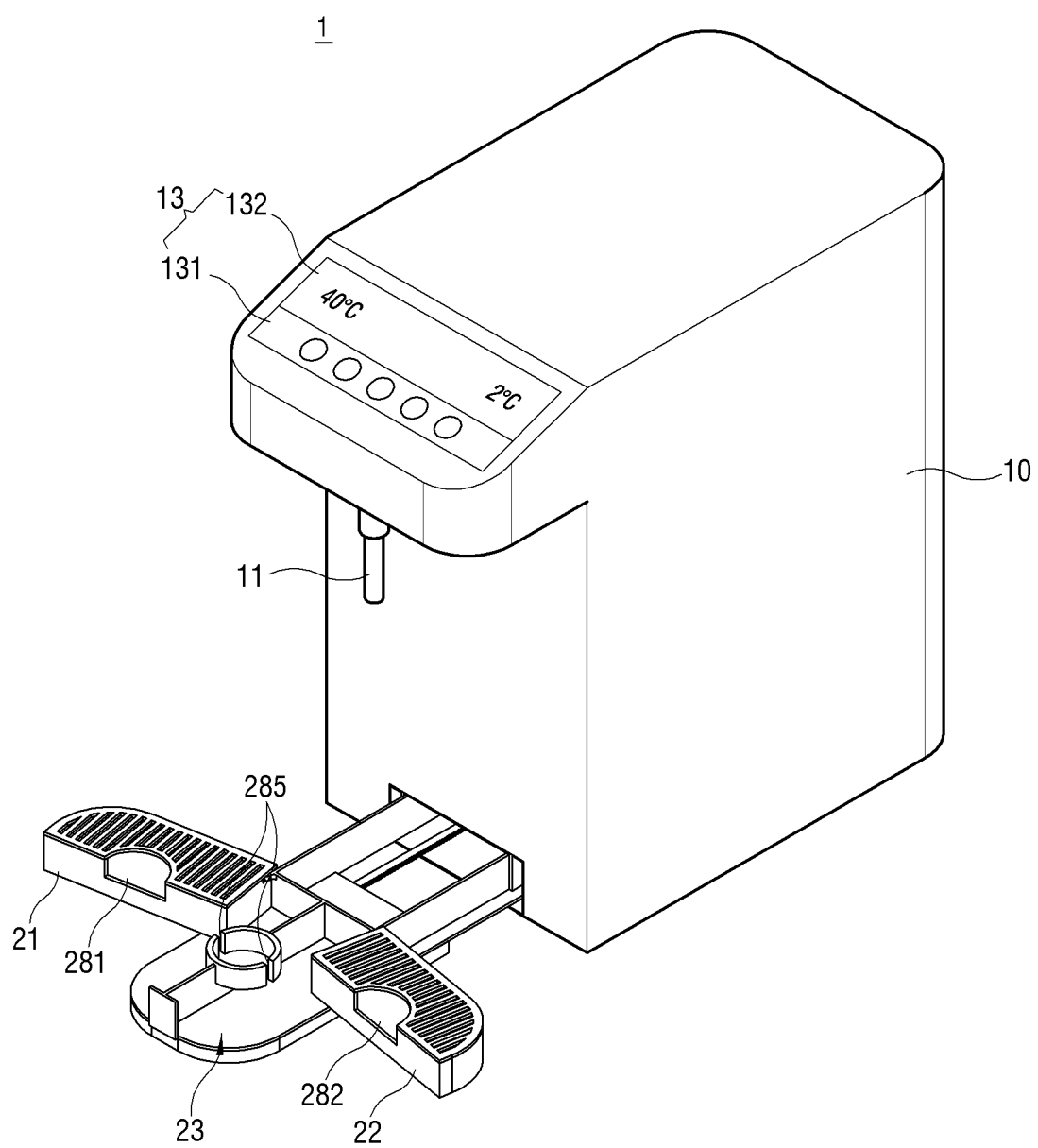
FIG. 15 illustrates an extended state of a tray area in the drip tray unit of FIG. 14.

FIG. 14 illustrates a drip tray unit 20 according to yet another embodiment, and FIG. 15 illustrates an extended state of a tray area in the drip tray unit 20 of FIG. 14.

The main body 10 includes a single cock 11. In this case, water falling from the single cock 11 collides with the front supporter 2321 positioned in the middle between the first and second drip trays 21 and 22. Thus, water colliding with the front supporter 2321 may splash in all direction, thereby leaking out.

Referring to FIGS. 14 and 15, the front supporter 2321 may include a small auxiliary drip tray 28 at a position where water falls from the cock 11.

The drip tray supporter 23 includes a communication hole 285 having a cylindrical shape and communicating with the first and second drip trays 21 and 22. The communicating hole 285 allows water collected in the drip tray supporter 23 to flow into the first and second drip trays 21 and 22.

The first and second drip trays 21 and 22 may include drip tray grooves 281 and 282 to accommodate the auxiliary drip tray 28 therein to avoid interference with the auxiliary drip tray 28 when the tray area is extended or reduced.

As an alternative embodiment, the auxiliary drip tray 28 may be provided in any one of the first and second drip trays 21 and 22 instead of the front supporter 2321. For example, when the auxiliary drip tray 28 is provided in the first drip tray 21, the front supporter 2321 and the second drip tray 22 may include a drip tray groove formed to accommodate the auxiliary drip tray 28 therein.

Although exemplary embodiments of the disclosure have been shown and described, the disclosure is not limited to the foregoing specific embodiments, various alternative modifications can be embodied by a person having an ordinary skill in the art without departing from the scope of the disclosure as claimed in the appended d claims, and such modified embodiments should not be understood separately from the technical sprit or prospect of the disclosure.

What is claimed is:

1. A water purifier comprising:
a main body having a water outlet at one side thereof; and
a drip tray unit disposed under the water outlet, the drip tray unit comprising:
a base disposed inside of the main body;
a plurality of drip trays to support a container, to store water drips, and to be rotatably folded or unfolded;
a drip tray supporter slidably movable in a first direction with respect to the main body or in a second direction which is opposite to the first direction, the drip tray supporter including:
a front supporter to support the container; and
a rear supporter to be withdrawn from or inserted into the base; and
an actuator to control a folding or an unfolding of the plurality of drip trays while interlocking with sliding movement of the drip tray supporter so that in response to the drip tray supporter moving in the first direction, the plurality of drip trays unfolds and the rear supporter is withdrawn from the base, and in response to the drip tray supporter moving in the second direction, the rear supporter is inserted into the base to be accommodated in the base.

2. The water purifier of claim 1, wherein the drip tray unit further comprises a base having a guide to guide the rear supporter to move slidably into or from the base.

3. The water purifier of claim 2, wherein the main body comprises a base mounting portion to which the base is mounted.

4. The water purifier of claim 2, wherein the actuator comprises:
a first gear having a rod shape, supported on the base, and extended to the drip tray supporter;
a second gear having a circle shape, engaging with the first gear, and configured to be rotated in the drip tray supporter;
a third gear having a circle shape, and comprising an upper gear provided in an upper center of the second gear, and a lower gear provided in a lower center of the second gear;
a fourth gear having a circle shape, engaging with the upper gear of the third gear, and configured to be rotated in the drip tray supporter;
a fifth gear having a circle shape, engaging with the fourth gear, and provided in one of the drip trays;
a sixth gear having a circle shape, engaging with the lower gear of the third gear, and configured to be rotated in the drip tray supporter;
a seventh gear having a circle shape, engaging with the sixth gear, and configured to be rotated in the drip tray supporter; and
an eighth gear having a circle shape, engaging with the seventh gear, and provided in an other one of the drip trays.

5. The water purifier of claim 1, wherein the actuator is a first actuator, and the drip tray unit further comprises a second actuator to actuate the drip tray supporter to move slidably.

6. The water purifier of claim 5, wherein the drip tray unit further comprises a base having a guide to guide the drip tray supporter to move slidably, and
wherein the second actuator comprises:
a ninth gear having a rod, having a first side supported on the drip tray supporter and a second side extended into the base;
a tenth gear having a circle, engaging with the ninth gear, and provided in the base; and
a motor to rotate the tenth gear.

7. The water purifier of claim 6, wherein the main body comprises a button to operate the motor.

8. The water purifier of claim 1, wherein the drip tray unit comprises a supporter provided between the drip trays and having a same height as a height of the drip trays.

9. The water purifier of claim 8, wherein the front supporter is disposed between the drip trays and having the same height as the height of the drip trays.

10. The water purifier of claim 9, wherein the supporter further comprises a transverse supporter extended in a transverse direction to the front supporter and having the same height as the height of the drip trays.

11. The water purifier of claim 10, wherein the rear supporter is extended in a rearward direction of the drip trays and having the same height as the height of the drip trays.

12. The water purifier of claim 11, wherein the drip tray unit further comprises a base having a guide to guide the rear supporter to move slidably, and
wherein the rear supporter comprises a pair of rear supporters extended from the transverse supporter rearwards with a space therebetween, and accommodated to be slidably movable within the guides of the base.

13. The water purifier of claim 12, wherein the drip tray unit comprises a first auxiliary drip tray provided in a space between the pair of rear supporters and the transverse supporter and storing water drips.

14. The water purifier of claim 9, wherein the front supporter comprises a second auxiliary drip tray to catch water drips falling from the water outlet.

15. The water purifier of claim 14, wherein the drip tray comprises a drip tray groove to accommodate the second auxiliary drip tray therein.

16. The water purifier of claim 2, wherein the guide has a protrusion and the rear supporter includes a stopper so that the stopper is stopped by the protrusion to prevent the drip tray supporter from being separated from the base.

17. The water purifier of claim 12, wherein the guide has a protrusion and the rear supporter includes a stopper so that the stopper is stopped by the protrusion to prevent the drip tray supporter from being separated from the base.

18. A water purifier comprising:
a main body having a water outlet at one side thereof; and
a drip tray unit disposed under the water outlet, the drip tray unit comprising:
a base disposed inside of the main body;
a plurality of drip trays to support a container, to store water drips, and to be rotatably folded or unfolded;
a drip tray supporter slidably movable in a first direction with respect to the main body or in a second direction which is opposite to the first direction, the drip tray supporter including:
a base plate;
a supporter disposed on top of the base plate to support the container, the supporter including:
a front supporter to support the container; and
a rear supporter to be withdrawn from or inserted into the base,
wherein in response to the drip tray supporter moving in the first direction, the plurality of drip trays folds and the rear supporter is withdrawn from the base, and
in response to the drip tray supporter moving in the second direction, the plurality of drip trays unfolds and the rear supporter is inserted into the base to be accommodated in the base.

19. The water purifier of claim 18, wherein the drip tray unit further comprises a plurality of gears connecting the drip tray supporter and the plurality of drip trays, and an actuator to control the plurality of gears to fold or unfold the plurality of drip trays.

* * * * *